(12) United States Patent
Lazzarini et al.

(10) Patent No.: US 12,740,577 B2
(45) Date of Patent: Sep. 22, 2026

(54) MACHINE FOR PROCESSING LIQUID OR SEMI-LIQUID FOOD PRODUCTS

(71) Applicant: ALI GROUP S.R.L.—CARPIGIANI, Cernusco sul Naviglio (IT)

(72) Inventors: Roberto Lazzarini, Reggio Emilia (IT); Federico Tassi, Bologna (IT)

(73) Assignee: ALI GROUP S.R.L.—CARPIGIANI, Cernusco sul Naviglio (IT)

( * ) Notice: Subject to any disclaimer, the term of this patent is extended or adjusted under 35 U.S.C. 154(b) by 100 days.

(21) Appl. No.: 18/631,329

(22) Filed: Apr. 10, 2024

(65) Prior Publication Data

US 2024/0358038 A1 Oct. 31, 2024

(30) Foreign Application Priority Data

Apr. 28, 2023 (IT) ........................ 102023000008373

(51) Int. Cl.
*A23G 9/22* (2006.01)
*A23G 9/28* (2006.01)
*F25D 23/12* (2006.01)

(52) U.S. Cl.
CPC ............... *A23G 9/228* (2013.01); *A23G 9/28* (2013.01); *F25D 23/12* (2013.01); *F25D 2600/04* (2013.01)

(58) Field of Classification Search
CPC .. A23G 9/228; A23G 9/28; A23G 9/12; F25D 23/12; F25D 2600/04; F25D 2303/083–0831
See application file for complete search history.

(56) References Cited

U.S. PATENT DOCUMENTS 4,429,549 A 2/1984 Randolphi
5,363,746 A * 11/1994 Gordon .................... A23G 9/12 366/601
2003/0150236 A1 8/2003 Ross

FOREIGN PATENT DOCUMENTS

EP 0106814 A2 4/1984
EP 3453264 A1 3/2019
WO WO-2005108884 A1 * 11/2005 ............... F25D 3/08

OTHER PUBLICATIONS

Italian Search Report dated Oct. 13, 2023 from counterpart Italian App No. IT 202300008373.

* cited by examiner

*Primary Examiner* — Cassey D Bauer
(74) *Attorney, Agent, or Firm* — SHUTTLEWORTH & INGERSOLL, PLC; Timothy J. Klima

(57) ABSTRACT

A machine for processing liquid or semi-liquid food products, including: a container for the product with walls having an outside surface; a stirrer mounted inside the container; an actuator connected to the stirrer to rotate the stirrer; a dispenser connected to the container to extract the product; a refrigeration system, including: a closed circuit circulating a first heat exchanger fluid, an evaporator, compressor, condenser and throttle element. The fluid flows in the closed circuit through the evaporator, compressor, condenser and throttle element, in order. A control unit controls the actuator. The evaporator is in contact with the outside surface of the container to cool the walls of the container and includes a cooling chamber extending around the container for cooling the container. The cooling chamber encloses the evaporator and is permeated by a second heat exchanger fluid, which increases a thermal inertia of the evaporator.

19 Claims, 11 Drawing Sheets

Fig.7A
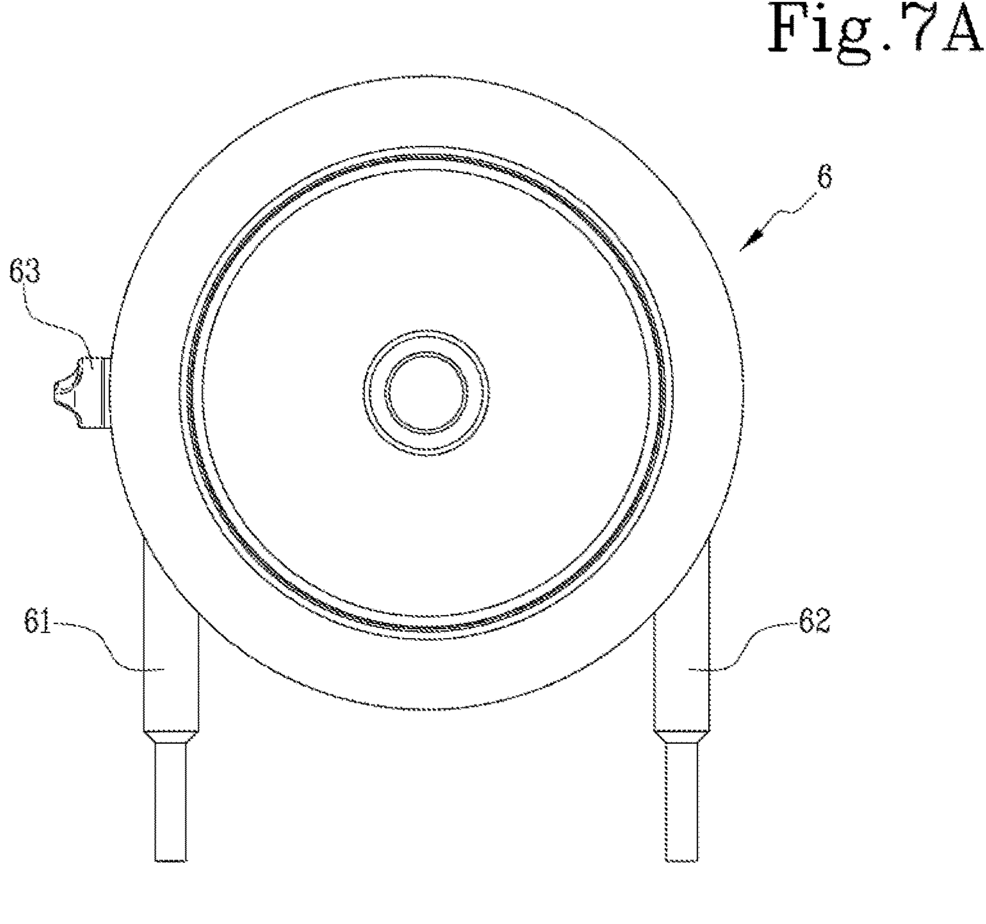
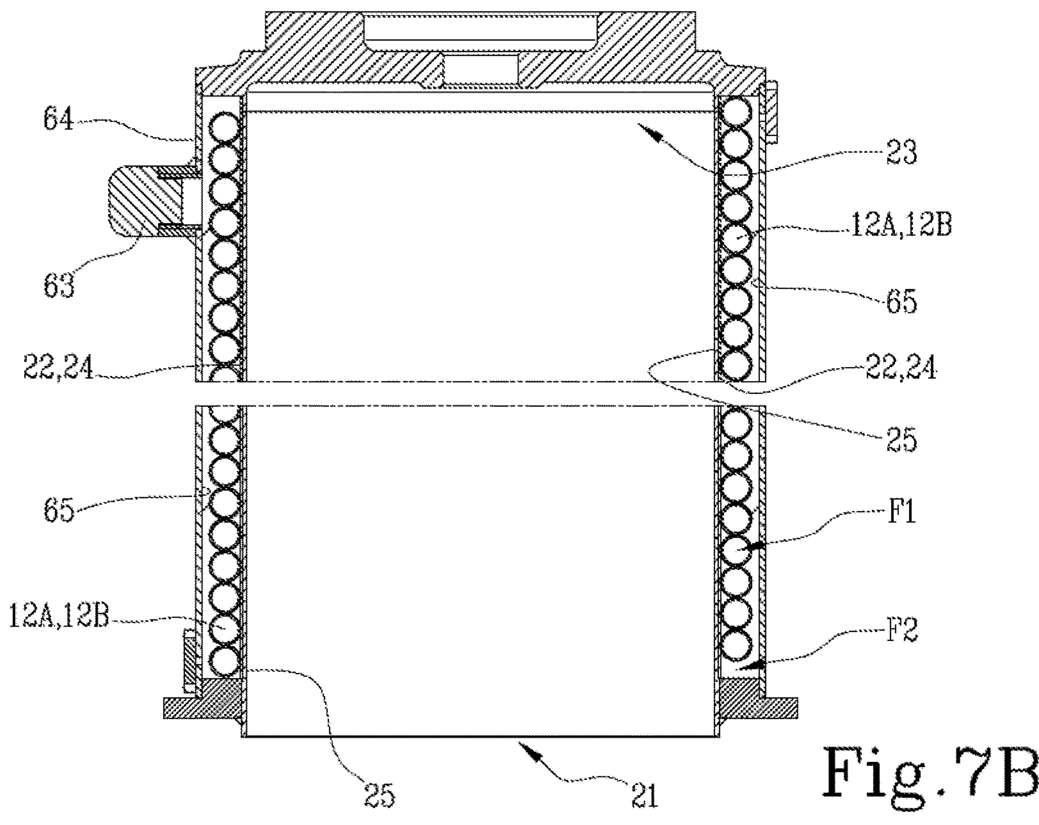
Fig.7B

MACHINE FOR PROCESSING LIQUID OR SEMI-LIQUID FOOD PRODUCTS

This disclosure relates to a machine for processing (liquid and/or semi-liquid and/or semi-solid) food products.

More specifically, this innovation relates to machines for making and dispensing food products, such as, for example, ice creams, whipped cream, dessert creams, chocolate, yogurt, jams and the like.

Generally speaking, these machines comprise a container for containing the product to be processed, a stirrer mounted inside the container and used for mixing the product, and at least one dispensing tap mounted at the bottom of the front of the container.

These machines also comprise a thermal treatment system for changing, controlling and adjusting the temperature of the food product being processed.

There are prior art refrigeration systems in which a heat exchanger fluid circulates.

Generally speaking, the refrigeration system comprises a compressor, which increases the pressure of the heat exchanger fluid, a heat exchanger, which draws heat from the heat exchanger fluid, exchanging it with the outside environment, an element for reducing the pressure (for example, a throttle valve) which reduces the pressure of the heat exchanger fluid and an evaporator which draws heat from the product to be dispensed to transfer it to the heat exchanger fluid.

The evaporator usually cools the container which holds the product to be processed and thus cools the product.

It is known that cooling in this manner results in condensation on the outside surface of the container: the air in the proximity of the container is cooled and changes to a liquid state.

In particular, if an insufficient amount of alloy is applied during the plating process, certain zones between the evaporator and the container allow air to enter, causing the atmospheric moisture to condense.

During cooling by the effect of the evaporator, the water produced by the condensation may freeze and change from the liquid state to the solid state, thus expanding its volume.

This phenomenon, repeated each time a machine work cycle is run, may lead to deterioration of machine performance and warping of the container walls.

In particular, convex plastic deformation may occur at the parts of the outside surface of the container which are in contact with the evaporator.

This problem is more evident when the surface of the container is flat in that a flat surface is less resistant to deformation than a curved one.

In the trade, there is a need for a machine for processing food products which ensures that the product to be dispensed is cooled in a uniform and particularly efficient manner.

There is also a need for a machine for processing food products which can ensure high performance in transferring heat from the product to the evaporator.

Yet another need is to be able have a machine for processing food products which can prevent deformation of the walls of the container in which the product is being processed.

The aim of this disclosure is to provide a machine for processing liquid and/or semi-liquid food products which meets the above-mentioned needs.

In particular, the aim of this disclosure is to provide a machine for processing liquid and/or semi-liquid food products in which the product to be dispensed can be cooled in a uniform and particularly efficient manner and which can ensure high performance in the exchange of heat between the food product and the thermal treatment system while at the same time preventing deformation of the walls of the container where the food product is being processed.

This aim is fully achieved by the machine of this disclosure, as characterized in the appended claims.

The features of the invention are clearly described in the claims below and its advantages are more apparent from the detailed description which follows, with reference to the accompanying drawings which illustrate a preferred, non-limiting example embodiment of the invention and in which:

FIGS. 7A and 7B show respectively a front view and a cross sectional view of the cooling chamber shown in FIG. 6;

Figure 1:
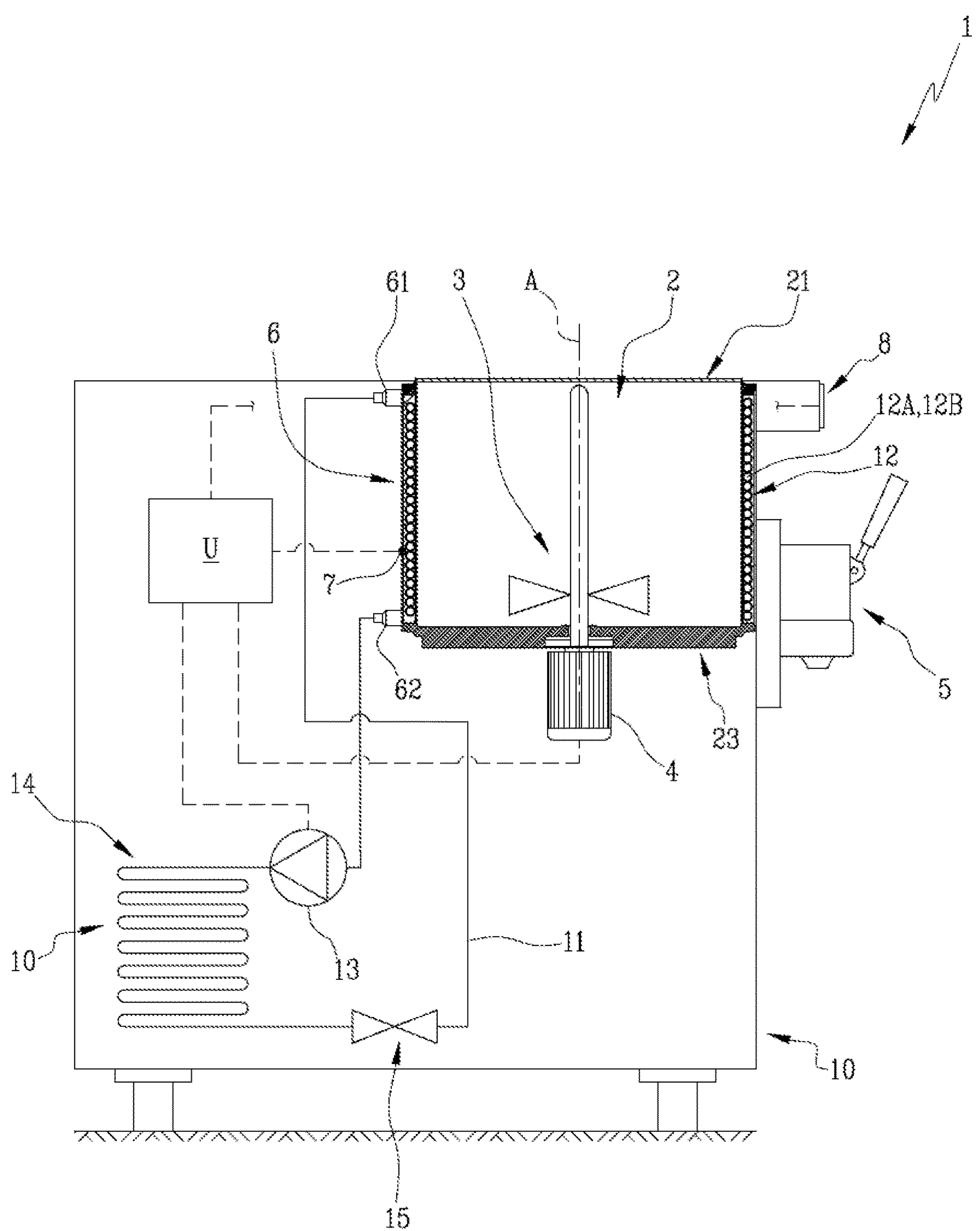
FIG. 1 shows a schematic front view of an embodiment of a machine according to this disclosure.

It should be noted that the drawings are schematic and are therefore not representative of the actual dimensions of the system.

With reference to the accompanying drawings, the numeral 1 denotes in its entirety a machine for processing liquid, or semi-liquid, or semi-solid food products, in particular for making, treating and dispensing the aforesaid food products.

For example, the food products may be ice creams, whipped cream, dessert creams, mixtures for cake and pastry fillings, yogurt or the like.

According to the disclosure, the machine 1 for processing liquid or semi-liquid products, hereinafter also referred to simply as "machine 1" for short, comprises at least one container 2 for containing the product to be processed and provided with walls having an outside surface 22 and an inside surface 25.

The machine 1 comprises a stirrer 3 mounted inside the container 2.

The stirrer 3 is configured to be driven in rotation about a mixing axis A.

Figure 2:
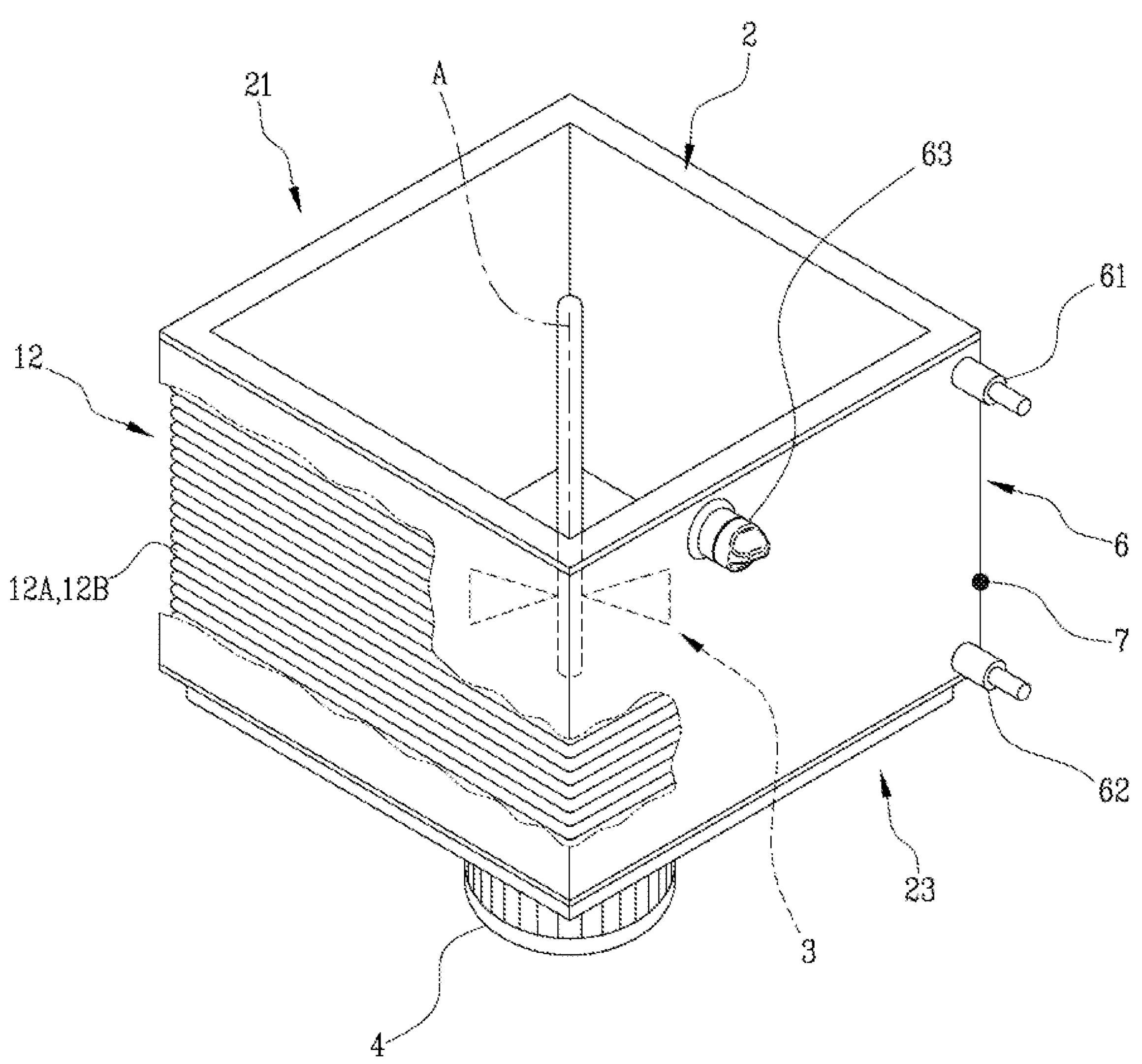
FIG. 2 shows a schematic perspective view of an embodiment of a cooling chamber of the machine of this disclosure.
Figure 3A:
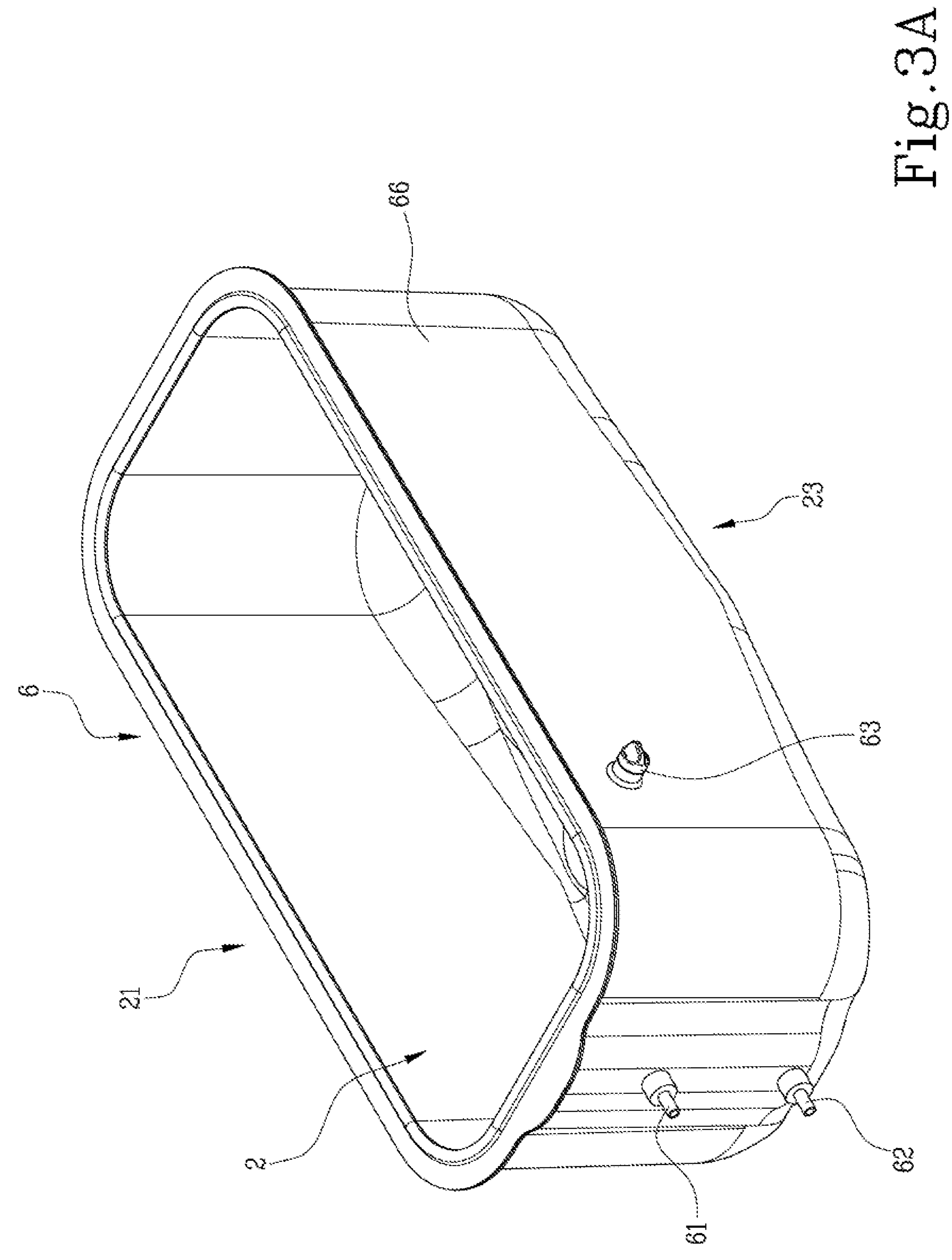
FIGS. 3A and 3B show respectively a perspective view of an embodiment of a cooling chamber of the machine of this disclosure and an exploded view of the cooling chamber.
Figure 3B:
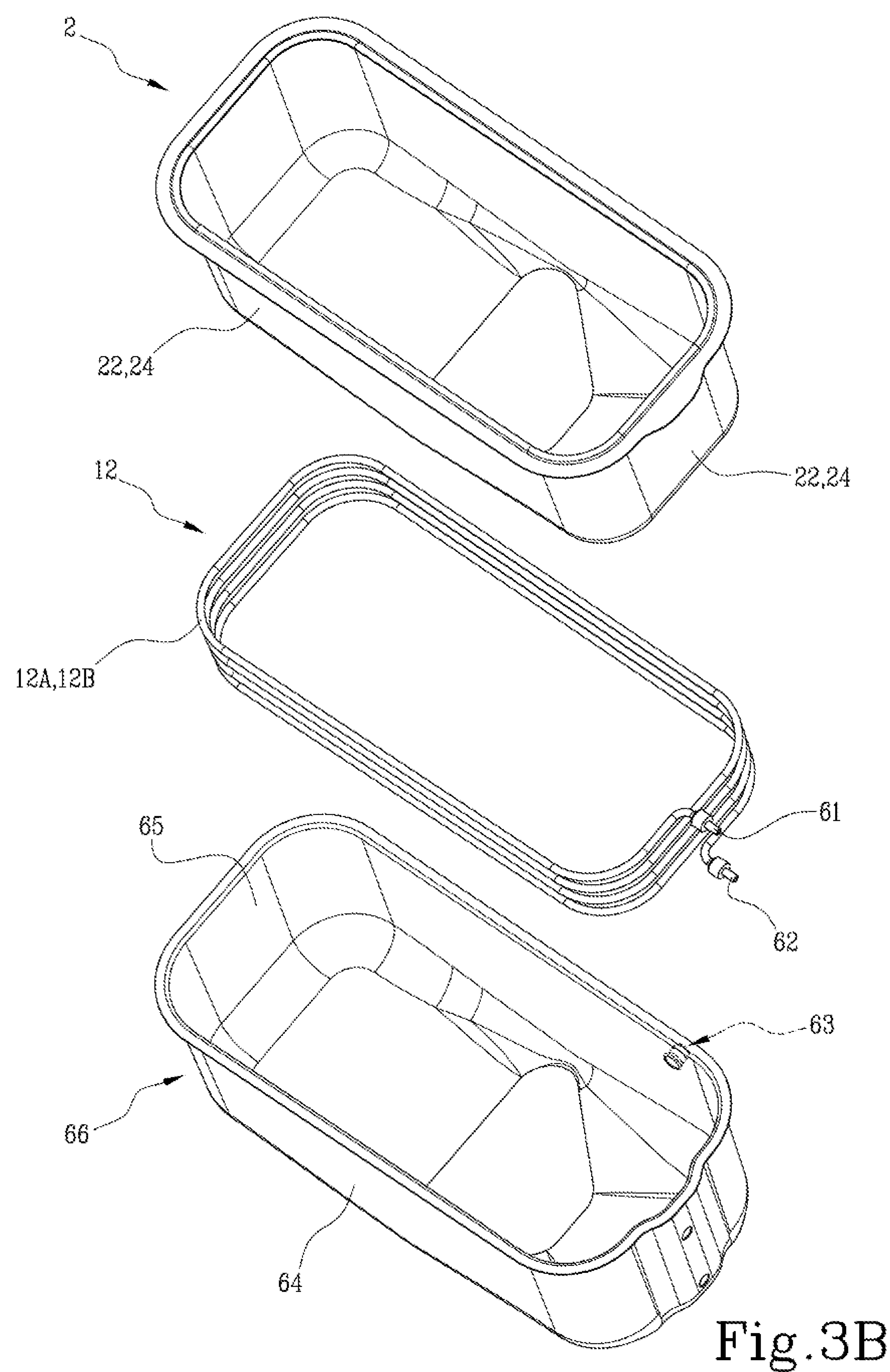
Figure 4A:
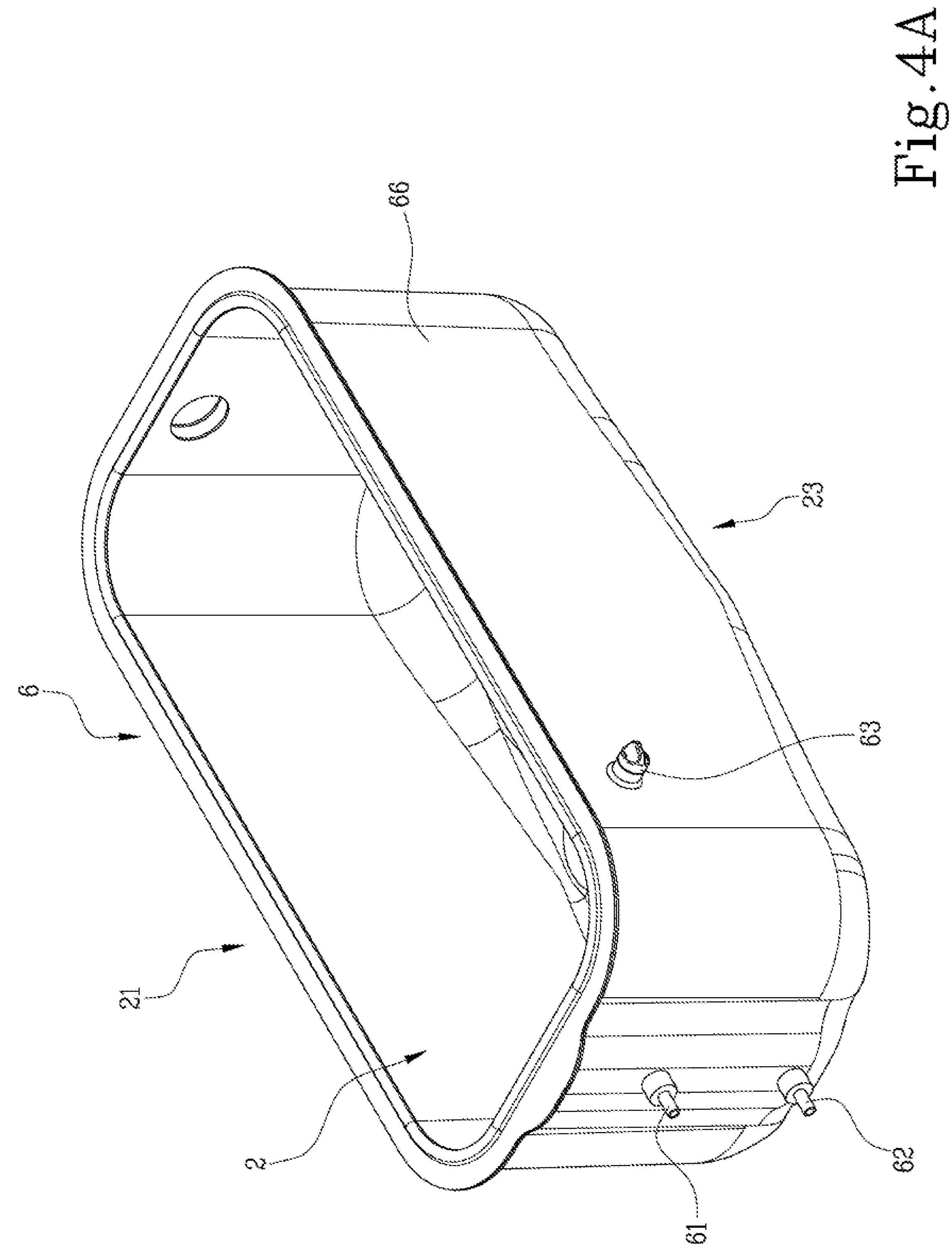
FIGS. 4A and 4B show respectively a perspective view of a further embodiment of a cooling chamber of the machine of this disclosure and an exploded view of the cooling chamber.
Figure 4B:
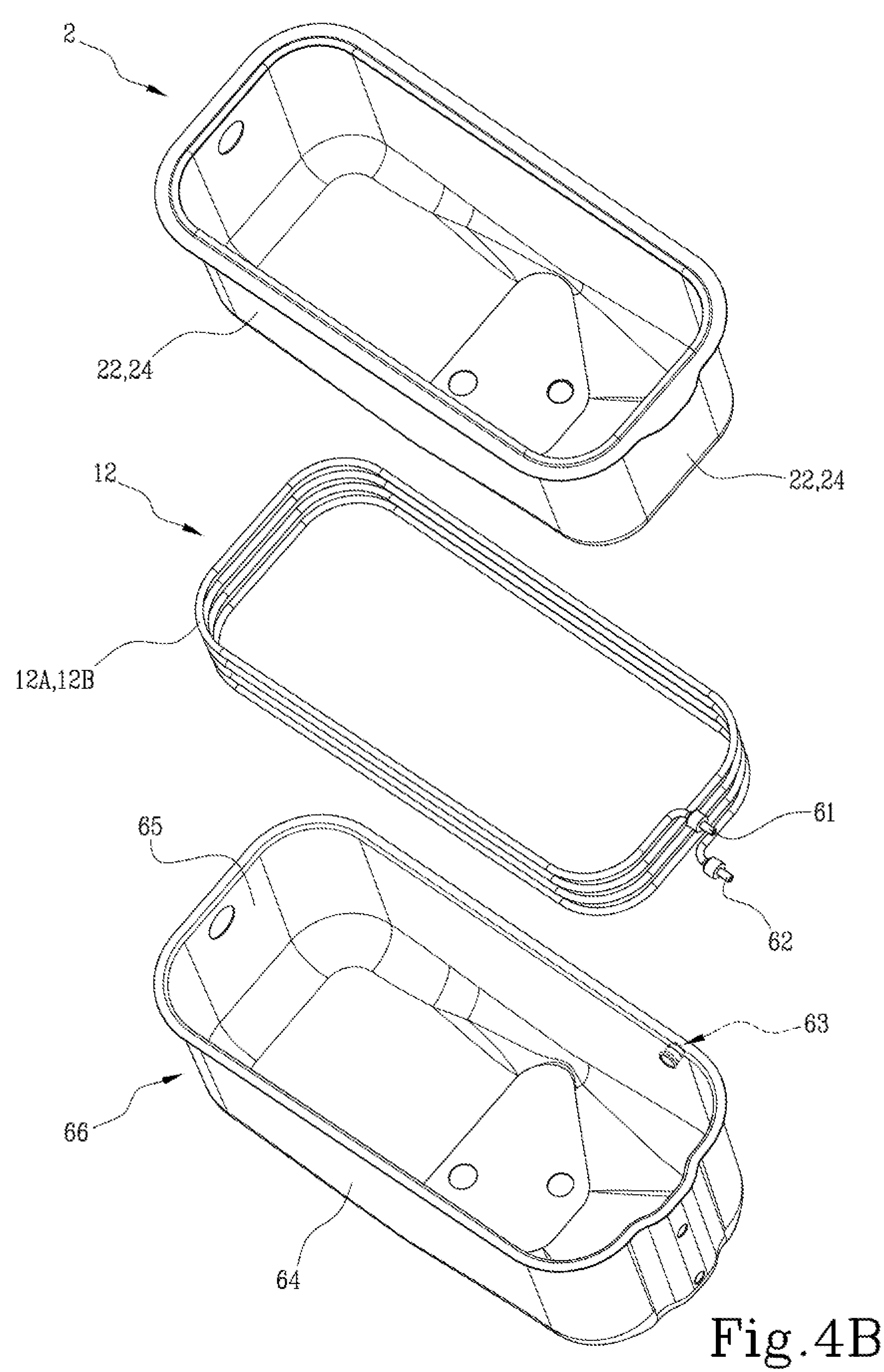

In an embodiment, illustrated, for example, in FIGS. 1 to 4B, the container 2 is a tub 2.

In particular, the tub 2 defines a containing space in the shape of a parallelepiped, for containing the product to be processed.

According to an aspect, the mixing axis A corresponds to the axis of the tub 2.

Figure 5:
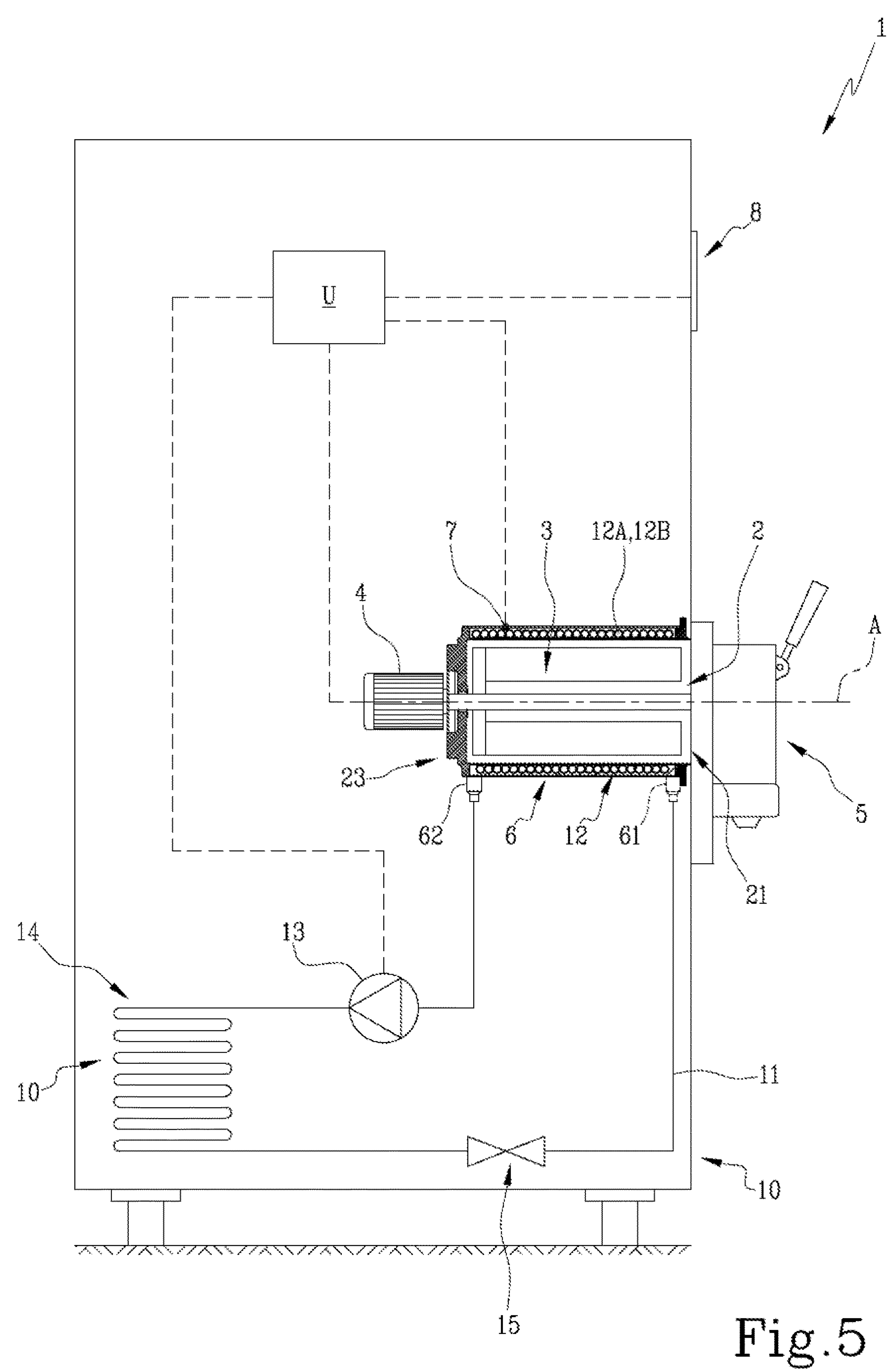
FIG. 5 shows a schematic front view of an embodiment of a machine according to this disclosure.
Figure 6:
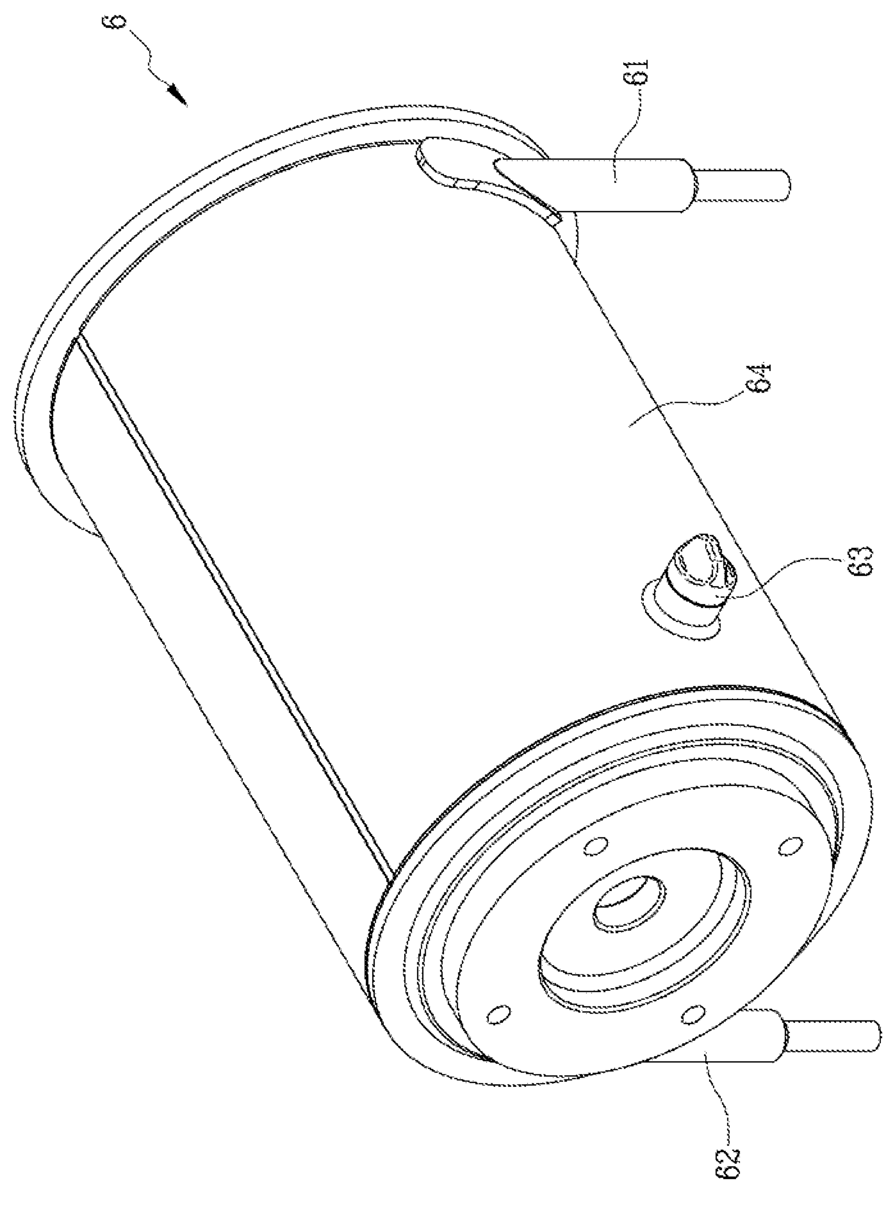
FIG. 6 shows a schematic perspective view of an embodiment of a cooling chamber of the machine of this disclosure.
Figure 8:
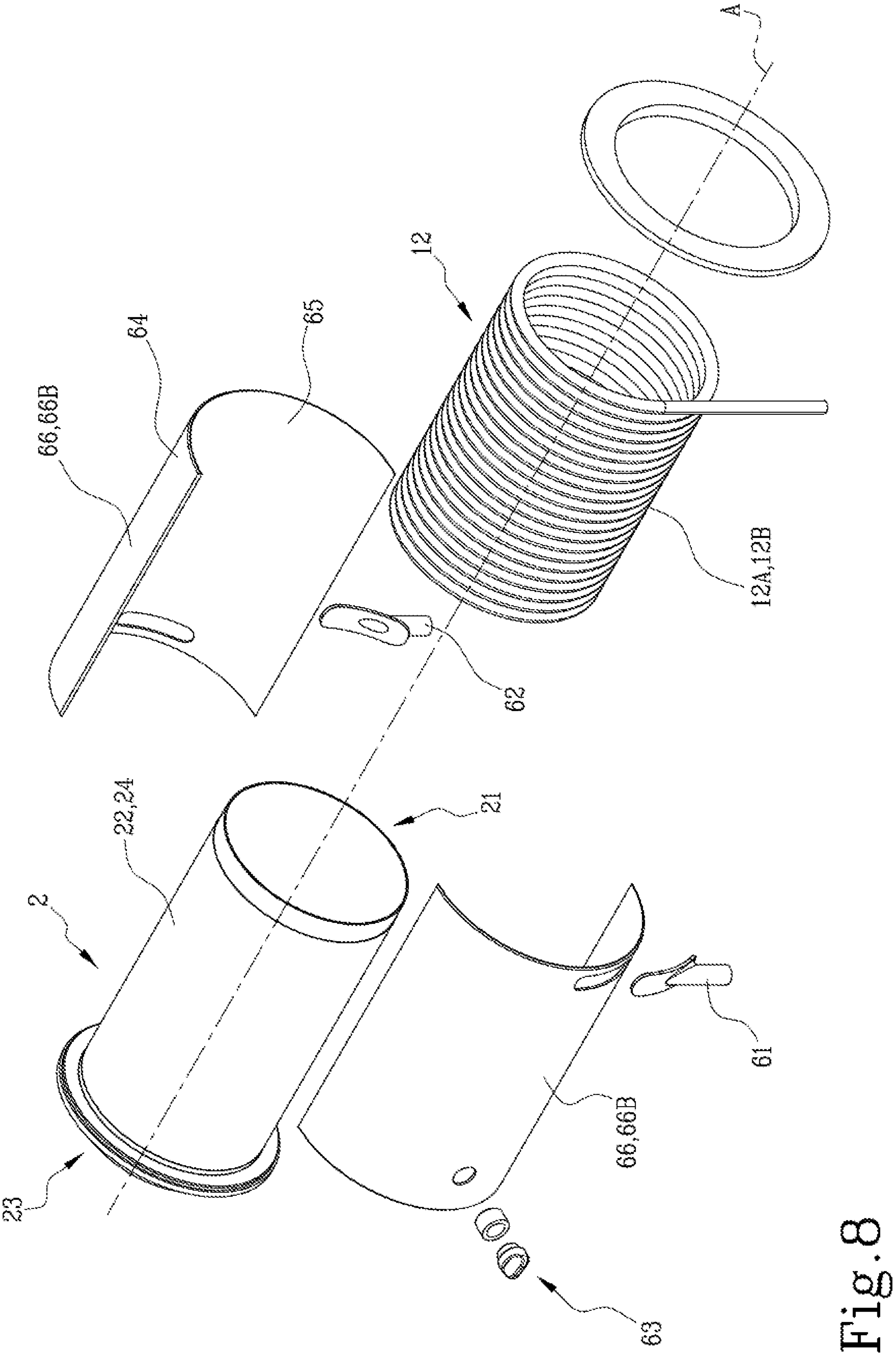
FIGS. 8 and 9 show schematic, exploded perspective views of two distinct embodiments of the cooling chamber shown in FIG. 6.
Figure 9:
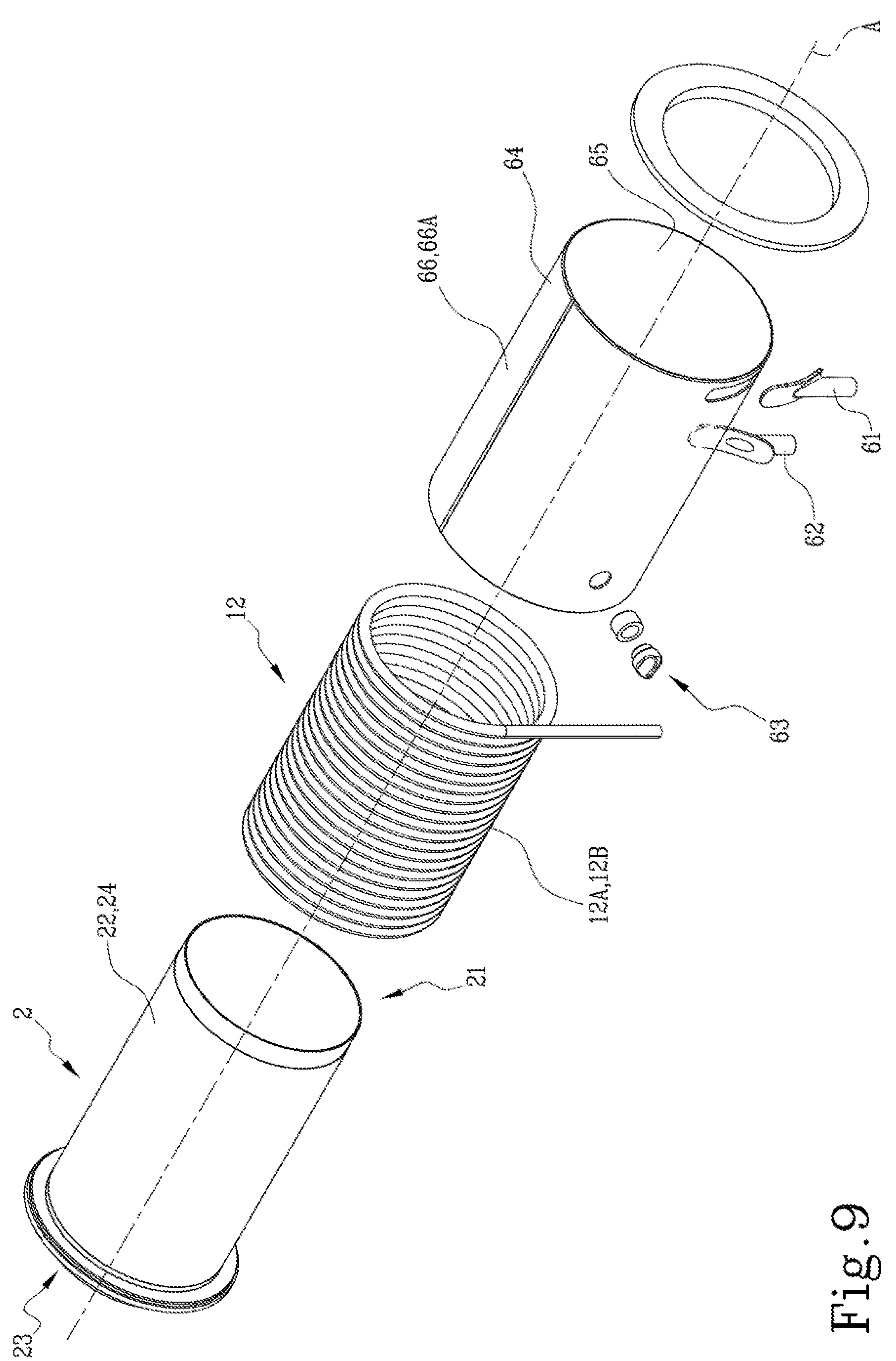

In an alternative embodiment, illustrated, for example, in FIGS. 5 to 9, the container 2 is cylindrical in shape and the mixing axis A corresponds to the axis of the container 2.

It should be noted that in a configuration not illustrated in the accompanying drawings, the machine comprises both the cylindrical tub 2 and the cylindrical container 2. In such an embodiment, the tub is located above the cylindrical container and is connected to the cylindrical container by a duct for transferring the food product that is being processed. The tub comprises an opening at the duct, an opening at the stirrer.

The machine 1 comprises an actuator 4 connected to the stirrer 3 to set the stirrer 3 in rotation about the mixing axis A.

The machine 1 comprises a control unit U configured to control at least the actuator 4, the control unit U comprising a processor, memory and operating instructions.

The stirrer 4 may be configured to mix products having a mainly liquid component, that is, liquid or semi-liquid products, and/or to mix predominantly thick products, that is, semi-solid products.

The machine 1 comprises a dispenser 5 connected to a top surface 21 of the container 2 to allow extracting the product to be processed.

To better clarify, the food product can be extracted from the container 2 through at least one outlet hole located in the top surface 21 of the container 2, and the product can then be dispensed via the dispenser 5.

Considering the embodiment in which the container 2 is a tub, in particular a tub 2 defining a space in the shape of a parallelepiped, for containing the product to be processed, the top surface 21 corresponds to a base surface of the tub 2, in particular to the surface that is connected to the dispenser 5.

In use, the top surface 21 corresponds to the bottom surface of the tub 2 and the dispenser 5 draws the food product from the tub 2 through an opening in the top surface 21 itself.

Considering the cylindrical embodiment of the container 2, alternative to the preceding, parallelepiped-shaped one, the top surface 21 corresponds to a base surface of the container 2, in particular to the surface that is connected to the dispenser 5.

Preferably, the dispenser 5 comprises a control lever, configured to open or close a duct which is in communication with the interior of the container 2.

The machine 1 comprises a refrigeration system 10, comprising: a closed circuit 11 configured for circulating a first heat exchanger fluid F1, an evaporator 12 associated with the container 2, a compressor 13, a condenser 14 and a throttle element 15.

The first heat exchanger fluid F1 flows in the closed circuit 11 through the following: the evaporator 12, the compressor 13, the condenser 14 and the throttle element 15, in that order.

According to an aspect of this disclosure, the control unit U is configured to control the refrigeration system 10.

In particular, in a preferred embodiment, the control unit U is configured to control the compressor 13.

Advantageously, the control unit U, by controlling the compressor 13, can control the circulation of the first heat exchanger fluid F1 in the closed circuit 11.

Preferably, the refrigeration system 10 is configured to cool the product inside the container 2 to a temperature of between 0° C. and −15° C., more preferably between −3° C. and −10° C.

According to this disclosure, the evaporator 12 is in contact with the outside surface 22 of the walls of the container 2 in order to cool the walls of the container 2 (hence the product inside it).

Preferably, the evaporator 12 is tubular in shape and is positioned with the outside surface of the tube in contact with the outside surface 22 of the walls of the container 2.

According to this disclosure, the machine 1 comprises a cooling chamber 6 for cooling the container 2.

In particular, according to an aspect of this disclosure, the refrigeration system 10 comprises the cooling chamber 6 for cooling the container 2.

The cooling chamber 6 extends around the container 2 and is configured to enclose the evaporator 12 within it. In other words, the evaporator 12 is inside the cooling chamber 6 and is positioned between the container 2 for the product to be processed and the inside surface 65 of the outside wall 66 of the cooling chamber 6.

The cooling chamber 6 is permeated with a second heat exchanger fluid F2 to increase the thermal inertia of the evaporator 12.

Basically, the second heat exchanger fluid F2 defines a mass of heat exchanger fluid, substantially limited to the interior of a chamber which is closed, as is the cooling chamber 6, thus increasing the thermal inertia and, in practice, making the cooling of the container 2 more stable and efficient.

To better clarify, the evaporator 12 is immersed in the second heat exchanger fluid F2 to ensure optimal heat exchange between the first heat exchanger fluid F1, which is circulating in the evaporator 12, and the inside surface of the container 2.

The exchanging of heat between the first heat exchanger fluid F1 and the product occurs as follows.

The evaporator 12 exchanges heat with the container 2 by direct contact (in some zones) with the outside surface 22 of the container 2 itself and also exchanges heat with the second heat exchanger fluid F2, thus cooling the second fluid F2 and also cooling certain zones of the outside surface 22. By conduction, the cooling of the outside surface 22 also cools the inside surface 25 of the container 2, hence the food product inside it.

It should be noted that the action of the second heat exchanger fluid F2 thus enhances the overall efficiency of heat exchange between the evaporator 12 and the inside surface 25 of the container 2 (otherwise heat exchange would occur only at the point of contact between the evaporator 12 and the outside surface 22 of the walls of the container 2).

The second heat exchanger fluid F2 is preferably a diathermal fluid such as, for example, an ethylene glycol or a propylene glycol.

In other words, the second heat exchanger fluid F2 is diffused inside the cooling chamber 6, between the container 2 and the inside surface 65 of the outside wall 66 of the cooling chamber 6, in all of the space not occupied by the evaporator 12. The second heat exchanger fluid F2 surrounds the evaporator 12 inside the cooling chamber 6.

According to an aspect of the disclosure, as already explained above, the first heat exchanger fluid F1 flowing in the evaporator 12 cools the second heat exchanger fluid F2, which in turn contributes to cooling the container 2.

According to an aspect of this disclosure, the second heat exchanger fluid F2 is in contact with an outside surface 22 of the container 2 in order to cool the walls thereof.

It should be noted that, thanks also to the second heat exchanger fluid F2, the cooling of the outside surface 22 of the container 2 by contact occurs over the entire outside surface 22 inside the cooling chamber 6, advantageously increasing heat exchange.

To better clarify, the second heat exchanger fluid F2 provides thermal inertia; in effect, this fluid defines a mass of liquid at a predetermined temperature, capable of making the cooling effect uniform and stable.

Advantageously, the cooling of the container 2 via the second heat exchanger fluid F2, located inside the cooling chamber 6, ensures greater uniformity compared to cooling solely via the evaporator 12. In effect, the heat exchanger fluid F2 is diffused inside the whole of the cooling chamber 6 and thus ensures that, inside the cooling chamber 6, heat is transferred to all the parts of the outside surface 22 of the container 2 which are not in direct contact with the evaporator 12. The result is an improved capability of equalizing temperature distribution over the entire inside surface of the container 2.

Advantageously, the presence of the second heat exchanger fluid F2 allows preventing the formation of condensation on the outside surface 22 of the container 2, hence the formation of ice and warping of the walls of the container 2. The second heat exchanger fluid F2, which permeates the cooling chamber 6, therefore allows preventing the walls of the container 2 from deforming on account of this phenomenon.

In effect, the presence of the second heat exchanger fluid F2 means that there is no air inside the cooling chamber 6 in contact with the outside surface 22 of the container 2 which in turn allows preventing condensed water from forming and solidifying.

Preferably, the second heat exchanger fluid F2 is in contact with a portion of the outside surface 22 of the container 2 corresponding to a lateral surface 24 of the container itself.

Considering the embodiment in which the container 2 is a tub 2, in particular a tub 2 defining a space in the shape of a parallelepiped, for containing the product to be processed, the lateral surface 24 of the tub 2 has flat walls.

To better clarify, in such an embodiment, the heat exchanger fluid F2 is in contact with the four lateral surfaces of the parallelepiped defined by the tub 2.

Considering, for example, the cylindrical shape of the container 2, the heat exchanger fluid F2 is in contact with the lateral surface 24 of the cylinder and not with the two base surfaces.

In particular, by permeating the cooling chamber 6, the second heat exchanger fluid F2 is in contact with the portions of lateral surface 24 of the container 2 which are not in direct contact with the evaporator 12.

Advantageously, this feature optimizes the cooling uniformity of the container 2, hence of the inside surface of the container and of the product contained therein.

In effect, it should be noted that, in both embodiments, the cooling chamber 6 has a shape which is essentially defined by two parallelepipeds or two cylinders, an internal one (corresponding to the container 2) and an external one: the cooling chamber 6 occupies the space between them.

Considering the cylindrical shape of the container 2, the outside wall 66 of the cooling chamber 6 consists, in a first embodiment, of a single cylindrical component 66A. Such a single component 66A may be, for example, a metal sheet, or a generic metallic element which is suitably formed according to the shape of the container 2 with the two ends welded to each other.

In a second embodiment, the outside wall 66 of the cooling chamber 6 consists of two semi-cylindrical portions 66B welded to each other.

According to an aspect of this disclosure, the cooling chamber 6 of the container 2 is provided with a first, inlet opening 61, configured to connect the throttle element 15 to the evaporator 12 through the closed circuit 11.

In other words, the first heat exchanger fluid F1 is fed into the cooling chamber 6 by the closed circuit 11 through the first, inlet opening 61 so that, after flowing through the throttle element 15, it can circulate in the evaporator 12. In effect, the evaporator 12 is located entirely inside the cooling chamber 6.

The cooling chamber 6 of the container 2 is provided with a second, outlet opening 62 configured to connect the evaporator 12 to the compressor 13 through the closed circuit 11.

In other words, the first heat exchanger fluid F1 is emitted from the cooling chamber 6 by the closed circuit 11 through the second outlet opening 62 so that, after flowing through the evaporator 12, it can pass through the compressor 13.

Thus, based on what has just been described, the cooling chamber 6 may be defined as a gap between the outside surface 22 of the container 2 and the inside surface 65 of the outside wall 66 of the cooling chamber 6.

The width of the gap defined between the outside surface 22 of the container 2 and the inside surface 65 of the outside wall 66 of the cooling chamber 6 is between 3 mm and 30 mm, preferably between 4 mm and 25 mm and, still more preferably, between 5 mm and 20 mm.

It should be noted that the width might not be constant for the whole of the cooling chamber 6.

For example, considering the embodiment in which the container 2 is a tub 2, the gap is 5 mm wide at the lower portion of the tub 2, 10 mm wide at the lateral surface of the tub 2, and 25 mm wide at the first, inlet opening 61 and the second, outlet opening 62.

In a preferred embodiment, the machine 1 comprises a valve 63, mounted on an outside surface 64 of the outside wall 66 cooling chamber 6.

The valve 63 allows the second heat exchanger fluid F2 to flow into the cooling chamber 6.

The valve 63 is thus mounted in the proximity of a duct in communication with the cooling chamber 6 to close or open the duct.

In a preferred embodiment, the valve 63 is mounted in the proximity of a bottom surface 23 of the container 2, opposite the top surface 21.

In an embodiment, the evaporator 12 is a coil 12A.

Preferably, the coil 12A extends around the lateral surface 24 of the container 2, in direct contact with the lateral surface 24.

The evaporator 12 consists of ducts which are coiled in helical fashion (in the embodiment where the container 2 is in the shape of a parallelepiped or a cylinder).

In other words, the evaporator 12 is preferably a spiral tube extending around the lateral surface 24 of the container 2.

The spacing between the spiral turns 12B of the coil 12A may vary.

In other words, the evaporator 12 may consist of coils 12A where the spacings between the spiral turns 12B differ from each other.

In an embodiment, the machine 1 comprises a temperature sensor 7, mounted inside the cooling chamber 6.

The temperature sensor 7 is configured to measure a temperature of the second heat exchanger fluid F2.

The temperature sensor 7 is connected to the control unit U to send it a signal relating to the temperature of the second heat exchanger fluid F2.

In an embodiment, the machine 1 comprises a user interface 8 which is connected to the control unit U and is configured to allow interaction with a user.

The user interface 8 comprises at least one user operable control (preferably a plurality of controls).

Preferably, the user interface 8 comprises user-operable activation and selection controls and/or pushbuttons.

Advantageously, the user interface 8 allows displaying information relating to the machine 1 and/or to the product to be processed, such as, for example, the temperature of the second heat exchanger fluid F2.

Advantageously, via the user interface 8, in conjunction with the control unit U, it is possible to control different aspects of the machine 1, such as, for example, the movement of the stirrer 3 or the power supply and power of the compressor 13.

Advantageously, it is possible to control the movement of the stirrer 3 and/or the power supply and power of the compressor 13 as a function of the signal relating to the temperature of the second heat exchanger fluid F2.

The invention claimed is:

1. A machine for processing liquid or semi-liquid food products, comprising:

at least one container configured for containing the liquid or semi-liquid food products to be processed and including walls having an outside surface;

a stirrer mounted inside the at least one container;

an actuator connected to the stirrer to set the stirrer in rotation about a mixing axis;

a dispenser connected to an interior of the at least one container to allow extracting the liquid or semi-liquid food products to be processed;

a refrigeration system, comprising: a closed circuit configured for circulating a first heat exchanger fluid, an evaporator operatively connected with the at least one container, a compressor, a condenser and a throttle element, the first heat exchanger fluid flowing in the closed circuit through the following: the evaporator, the compressor, the condenser and the throttle element, in that order;

a control unit configured to control at least the actuator;

wherein the evaporator is in contact with the outside surface of the walls of the at least one container to cool the walls of the at least one container, a cooling chamber for cooling the at least one container and extending around the at least one container, the cooling chamber being configured to enclose the evaporator within the cooling chamber and being permeated by a second heat exchanger fluid, which increases a thermal inertia of the evaporator; and a valve, mounted on an outside surface of the cooling chamber at an upper portion of the cooling chamber, the valve being in fluid communication with the cooling chamber and being configured to allow the second heat exchanger fluid to flow into the cooling chamber.

2. The machine according to claim 1, wherein the second heat exchanger fluid is in contact with the outside surface of the at least one container to cool the walls.

3. The machine according to claim 1, wherein the cooling chamber of the container includes a first inlet opening, configured to connect the throttle element to the evaporator through the closed circuit, and a second outlet opening configured to connect the evaporator to the compressor through the closed circuit.

4. The machine according to claim 1, wherein the evaporator comprises a coil.

5. The machine according to claim 4, wherein the coil extends around a lateral surface of the at least one container.

6. The machine according to claim 1, wherein the at least one container is a tub.

7. The machine according to claim 5, wherein the lateral surface of the tub has flat walls.

8. The machine according to claim 6, wherein the tub defines a containing space shaped as a parallelepiped, for containing the liquid or semi-liquid food products to be processed.

9. The machine according to claim 1, wherein the control unit is configured for controlling the compressor.

10. The machine according to claim 1, and further comprising a temperature sensor mounted inside the cooling chamber to measure a temperature of the second heat exchanger fluid.

11. The machine according to claim 10, wherein the temperature sensor is connected to the control unit to send the control unit a signal relating to the temperature of the second heat exchanger fluid.

12. The machine according to claim 1, and further comprising a user interface connected to the control unit and comprising at least one user actuatable control.

13. The machine according to claim 1, wherein a width of a gap defined between the outside surface of the container and an inside surface of an outer wall of the cooling chamber is between 3 mm and 30 mm.

14. The machine according to claim 13, wherein the width of the gap defined between the outside surface of the container and the inside surface of the outer wall of the cooling chamber is between 4 mm and 25 mm.

15. The machine according to claim 14, wherein the width of the gap defined between the outside surface of the container and the inside surface of the outer wall of the cooling chamber is between 5 mm and 20 mm.

16. The machine according to claim 15, wherein the second heat exchanger fluid includes ethylene glycol.

17. The machine according to claim 15, wherein the second heat exchanger fluid includes propylene glycol.

18. The machine according to claim 1, wherein the second heat exchanger fluid includes ethylene glycol.

19. The machine according to claim 1, wherein the second heat exchanger fluid includes propylene glycol.

* * * * *